(12) United States Patent
Nicolas (10) Patent No.: US 7,193,655 B2
(45) Date of Patent: Mar. 20, 2007

(54) PROCESS AND DEVICE FOR DE-INTERLACING BY PIXEL ANALYSIS

(75) Inventor: Marina Nicolas, Le Fontanil Cornillon (FR)

(73) Assignee: STMicroelectronics SA, Montrouge (FR)

( * ) Notice: Subject to any disclaimer, the term of this patent is extended or adjusted under 35 U.S.C. 154(b) by 461 days.

(21) Appl. No.: 10/782,651

(22) Filed: Feb. 19, 2004

(65) Prior Publication Data

US 2004/0257467 A1 Dec. 23, 2004

(30) Foreign Application Priority Data

Feb. 19, 2003 (FR) .................................. 03 02013

(51) Int. Cl.
*H04N 7/01* (2006.01)
(52) U.S. Cl. ....................................... 348/448; 348/452
(58) Field of Classification Search ................ 348/448, 348/441, 451, 452; *H04N 7/01, 11/20*
See application file for complete search history.

(56) References Cited

U.S. PATENT DOCUMENTS 5,936,676 A    8/1999   Ledinh et al.
5,943,099 A    8/1999   Kim
6,262,773 B1 * 7/2001   Westerman ................. 348/448

OTHER PUBLICATIONS

French Preliminary Search Report dated Jul. 18, 2003 for French Application No. 0302013.

* cited by examiner

*Primary Examiner*—Sherrie Hsia
(74) *Attorney, Agent, or Firm*—Lisa K. Jorgenson; Jon A. Gibbons; Fleit, Kain, Gibbons, Gutman, Bongini & Bianco P.L.

(57) ABSTRACT

The invention provides for a process and a device for de-interlacing a video signal, wherein at output (S) is produced a signal (Sde) of video images de-interlaced by interpolating the pixels missing from the interlaced video signal presented at input (E), the interpolation on the output signal (Sde) being composed selectively (10) from a spatial interpolation (6), based on a transition detection and from a temporal interpolation (8) with a decision being made on the variable degree of presence of spatial interpolation and/or of temporal interpolation in the output signal (Sde), the decision being made as a function of a motion detection in the relevant area of the image, wherein the decision is made additionally as a function of a detection of the detail (2) in a relevant area of the image.

26 Claims, 4 Drawing Sheets

Vertical direction

Fig. 4a

Diagonal direction +26°

Fig. 4b

Diagonal direction +45°

Fig. 4c

Diagonal direction +63°

Fig. 4d

Diagonal direction -26°

Fig. 4e

Diagonal direction -45°

Fig. 4f

Diagonal direction -63°

PROCESS AND DEVICE FOR DE-INTERLACING BY PIXEL ANALYSIS

CROSS-REFERENCE TO RELATED APPLICATIONS

This application is based upon and claims priority from prior French Patent Application No. 03 02013, filed on Feb. 19, 2003 the entire disclosure of which is herein incorporated by reference.

FIELD OF THE INVENTION

The present invention generally relates to a de-interlacing process and device, more particularly for adapting signals consisting of interlaced fields to so-called progressive scanning systems.

BACKGROUND OF THE INVENTION

It will be remembered that a conventional video image is constituted, in respect of each image, by two fields, known as an even-numbered field and an odd-numbered field, which are interlaced on alternate lines. At display, these fields are scanned successively in time on the screen, typically a cathode ray tube, with the lines of the second field of an image being scanned on the spaces left between the scanning lines of the first field. Relative to a progressive scanning, where the successive lines of a complete image are displayed sequentially, interlaced frame scanning makes it possible, on the one hand to double the vertical resolution while retaining the same pass band or, at equal vertical resolution to double the frame return frequency and thereby to reduce the effects of flickering.

Analog and digital video signals are generally formatted in the form of interlaced frames, known as "interlaced video". Systems need therefore to be provided that convert interlaced video signals into non-interlaced video when it is necessary to display them in progressive scanning mode. The latter is used particularly in addressable line-by-line display devices such as plasma panels, liquid crystal displays, organic light-emitting diodes, etc. that use an electrode matrix network for example.

Systems of this kind, known as "de-interlacing" systems, must produce all the displayed lines of an image from only one field of the two fields of which it consists. In fact, since a field contains only one line in two of the image, de-interlacing calls on interpolation techniques that allow the content of the missing lines to be determined on the basis of the content of their adjacent lines and where appropriate the adjacent fields.

Conventionally, the interpolated output of the de-interlaced signal is constituted from a spatial interpolation and a temporal interpolation according to a variable weighting. The contribution of each of these two interpolations in the composition is generally variable over a range including the two extreme situations, namely 100% spatial interpolation and 100% temporal interpolation respectively. The decision in question therefore consists in determining the respective spatial and temporal interpolation weightings in the constitution of the interpolated output signal. This determination is made by a mixer, more generally known as a "fader", which receives the two types of interpolation at input and produces the interpolated signal at output with the aforementioned weightings.

In basic interlacing, the missing lines are in most cases interpolated by low-pass spatial filtering of the existing adjacent lines. A field fusion technique is used when the medium is a film, since it is then known that an odd-numbered field followed by the corresponding even-numbered field are connected at the same temporal position or that an even-numbered field followed by the corresponding odd-numbered field are connected at the same temporal position, the film detection systems allowing one or other of the situations to be identified. In a more general way, temporal interpolation may be used in the case of a fixed image. This gives the advantage of avoiding unnecessary losses of definition caused by low-pass spatial filtering.

In most de-interlacing systems that use both temporal interpolation and spatial interpolation, a decision is made once per field, generally taking the safest option, based on a film detection.

This implies that time domain filtering is used only if the whole image is detected as being static. This often leads to switching artifacts, where the image has a high level of sharpness when everything is motionless, but loses it as soon as motion appears.

Furthermore, we are moving towards video contents that have static parts inserted into them, such as logos in moving images or scrolling text over a quasi-static image. In this case, it is desirable to use an interpolation that is more spatial in some parts of the image and an interpolation that is more temporal in others. There are also sources where some parts of the image have a video content whereas other parts come from a film.

The result is that in all de-interlacing systems requiring a film detection, the de-interlacing is not optimum for the whole image.

Sophisticated motion compensation de-interlacing systems also suffer from this last limitation.

Accordingly, a need exists for a low-cost de-interlacing system that overcomes the limitations of the prior art and which does not require a high level of performance at medium detection system level, whatever the medium may be (film, video, or a mixture of the two)

SUMMARY OF THE INVENTION

The present provides a de-interlacing which does not require a high level of performance at medium detection system level, whatever the medium may be (film, video, or a mixture of the two). Implementing the present invention is also much less costly than sophisticated motion compensation solutions, also based on a detection of the medium.

More particularly, the invention present invention is a process for de-interlacing a video signal, wherein a signal is produced at output of video images de-interlaced by interpolating the pixels missing from the interlaced video signal presented at input, interpolation on the output signal being made up selectively of a spatial interpolation and a temporal interpolation with a decision being made on the variable degree of presence of spatial interpolation and/or of temporal interpolation in said output signal, said decision being made as a function of a detection of motion in the relevant area of the image, characterized in that said decision is made additionally as a function of a detection of the detail in a relevant area of the image.

To advantage, the decision is made for each individual interpolated pixel.

In the preferred embodiment, the spatial interpolation is made on the basis of a determination of the direction, among a series of directions under consideration connecting pixels on different lines of a given pixel window, for which the minimum difference is obtained between the values of the pixels on the different lines so connected along this direction, where one of the directions under consideration corresponds to an angle of approximately 26° and/or an angle of approximately 63° relative to the vertical, for a geometry with a pixel pitch that is equal in the vertical and horizontal directions.

To advantage, the spatial interpolation is made on the basis of a determination of the direction, among a series of directions under consideration connecting pixels on different lines of a given pixel window, for which the minimum difference is obtained between the values of the pixels on the different lines so connected along this direction, where, when there are several directions producing the same minimum difference between the values of the pixels so connected, the vertical direction or, where appropriate, the direction closest to the vertical direction is selected.

The spatial interpretation may be made on the basis of a determination of the direction, among a series of directions under consideration connecting pixels on different lines of a given pixel window, for which the minimum difference is obtained between the values of the pixels on the different lines so connected along this direction, where, when there are two diametrically opposed symmetrical directions producing the same minimum difference between the values of the pixels so connected, and arranging things so that neither of the two directions is closer to the vertical direction than the other, the vertical direction is selected instead.

The spatial interpolation may be made on the basis of an averaging of pixel values, where the same pixel positions are taken to determine both the averaging of the luma component of the interlaced input video signal and the averaging of the chroma component insofar as the same pixels are available for the two components.

The spatial interpolation may be made on the basis of a determination of the direction, among a series of directions under consideration connecting pixels on different lines of a given pixel window, for which the minimum difference is obtained between the values of the pixels on the different lines so connected along this direction, where the determination is made on the luma component of the interlaced input video signal, and in that the direction so determined is also used as the interpolation direction for the chroma component of this video signal.

To advantage, motion is detected, for a given pixel, by a recursive calculation implementing a motion value intermediate value loop with attenuation by a factor FA of less than 1.

Preferably, the motion value M is determined for a pixel for interpolation X of a field m by application of the following algorithm:

$$M0 = \max(|A-D|, FA*M(N))$$

$$Mp = \min(M(N1), M(N1+1))$$

$$M = \max(M0, Mp);$$

where:

A is the pixel in the same position as the pixel X, but in the field m+1,

D is the pixel in the same position as the pixel X, but in the field m−1,

M(N) equates to the value M0 calculated one frame before, i.e. N lines before, with N being the total number of lines in the image.

M(N1) equates to the value M0 calculated N1 lines before, where

N1=(N−1)/2 in the event of N being odd-numbered

N1=(N−2)/2 in the event of N being even-numbered and the luma lines for interpolation being the $2^{nd}$, $4^{th}$ etc. lines in the image, N1=N/2 in the event of N being even-numbered and the luma lines for interpolation being the $1^{st}$, $3^{rd}$ etc. lines in the image, M(N1+1) equates to the value M0 calculated (N+1) lines before, and FA is the attenuation factor.

Preferably, the attenuation factor FA is equal to 15/16.

The weighting may be determined on the basis of the luma component of the video signal.

The interpolation determined on the luma component of the video signal is obtained by the following algorithm:

$$I=med(s,t+M,t-M) \text{ if } M \leq d$$

$$\text{otherwise } I=s$$

where 1 represents the final interpolation s represents spatial interpolation, t represents temporal interpolation, M represents the measurement of motion at the interpolation position, d represents the measurement of detail at the interpolation position, and med (a,b,c) represents the median function of a, b, c.

The selection made on the basis of the luma component of the signal can also be applied to the chroma component.

Preferably:

i) in the event of the final interpolation on the luma being closer to the temporal interpolation, the final interpolation of the chroma is the temporal interpolation; and/or ii) in the event of the final interpolation on the luma being closer to the spatial interpolation, the final interpolation of the chroma is the spatial interpolation; and/or iii) when the spatial and temporal interpolations have an equal contribution in the final interpolation of the luma, the spatial and temporal interpolations have an equal contribution in the final interpolation of the chroma.

According to a second embodiment, the invention provides a device for de-interlacing a video signal, producing at output a signal of video images de-interlaced by interpolating the pixels missing from the interlaced video signal presented at input (E), the device including means to carry out the interpolation on said output signal by selective composition from a spatial interpolation and a temporal interpolation with a decision being made on the variable degree of presence of spatial interpolation and/or temporal interpolation in said output signal, these means making said decision as a function of a detection of motion in the relevant area of the image, characterized in that the means make said decision additionally as a function of a detection of the detail in a relevant area of the image.

The means cited may determine the weighting for each individual interpolated pixel.

The aforementioned device may include programmed means for carrying out the process according to the first embodiment.

According to a third embodiment, the present invention provides a video display device with display by sequential scanning able to function from interlaced input video signals, characterized in that it includes a device according to the second embodiment so as to bring about the de-interlacing that allows sequential scanning signals to be obtained.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention will be apparent from the following detailed description taken in conjunction with the accompanying drawings in which:

FIGS. 4a to 4g each resume the representation in FIG. 3 by showing respectively a direction of possible spatial interpolation, namely: vertical (FIG. 4a), diagonal at +26°, diagonal at +45° (FIG. 4b), diagonal at +63° (FIG. 4c), diagonal at −26° (FIG. 4d), diagonal at −45° (4e), and diagonal at −63° (FIG. 4g);

DESCRIPTION OF THE PREFERRED EMBODIMENTS

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Figure 1:
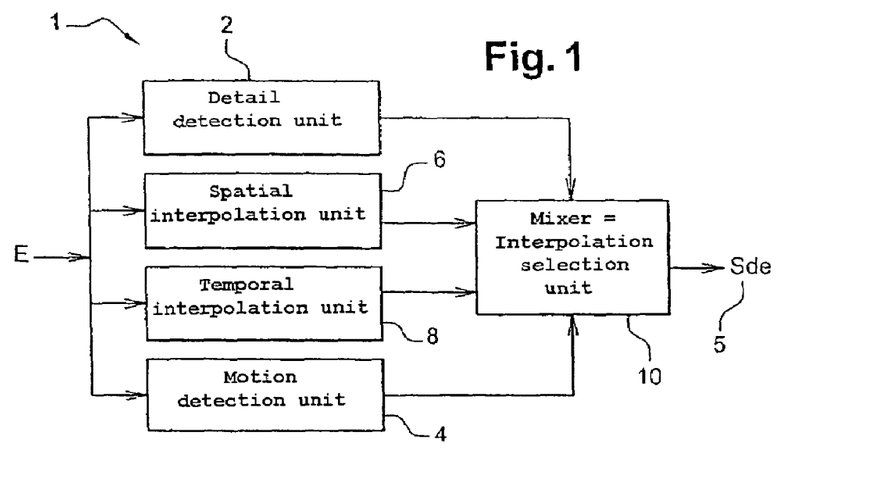
FIG. 1 is a system diagram of a de-interlacing system in accordance with the invention.

A block diagram of the de-interlacing system 1 according to the preferred embodiment of the invention is given in FIG. 1.

This system 1 accepts at input E the successive fields of an interlaced video signal, each field corresponding to a video half image while containing one line in two alternately over the whole image. At output S, the system produces, for each input field, a complete video image by filling in the lines missing from the field using an interpolation technique. This interpolation technique may use information coming from several successive fields, particularly from the previous field and from the successive field. This may involve a period of time equal to a field in the output, but the rate of one complete output video image per field presented at input is retained nonetheless. The output signal S can thus be used on a progressive scanning screen, such as a plasma panel, a liquid crystal display, and other matrix display devices, as well as some types of cathode ray tube specially designed for this type of scanning.

At system level, the interlaced video fields presented at the input E of the system are transmitted simultaneously with and in parallel to four units:
a detail detection unit 2,
a motion detection unit 4,
a spatial interpolation unit 6, and
a temporal interpolation unit 8.

The outputs of these four units 2–8 are presented at input of an interpolation selection unit 10, also known as a mixer or "fader" which produces at its output S the de-interlaced signal Sde of the system 1 for exploitation.

The interpolation selection unit 10 produces its output signal S from the spatial and temporal interpolations at its inputs. More particularly, this output signal is of variable composition over a range from 100% spatial interpolation to 100% temporal interpolation, the contribution of each of these component parts being fixed by weighting coefficients Ps and Pt for the spatial and temporal interpolations respectively. By playing on these coefficients, the selection unit is able to produce interpolation mixes between these two extremes, hence the designation mixer. To determine the weightings—and therefore the rate of mix of the two interpolations in the output signal—the unit evaluates for the relevant image pixel not only the information about motion as supplied by the motion detection unit 4, but also information about the detail, as supplied by the detail detection unit 2.

The weighting coefficients between the spatial and temporal interpolations can be established from the median formula:

med (t−M, t+M, s), where t and s are respectively the values of the temporal and spatial interpolations and M the motion measurement value.

These formulae are well-known to those of average skill in the art and will not be analyzed here in the interests of conciseness.

In practice, a median filter can be set up that is low-cost in hardware terms, whereas accurate calculation of the weighting coefficients followed by their application so as to calculate the final interpolation is generally more expensive.

In the same way, to determine which weighting shall predominate, the calculated final interpolation value is used and the difference between this interpolation and the spatial interpolation on one hand and the difference between this final interpolation and the temporal interpolation on the other hand are compared directly.

The interpolation selection unit 10 is capable of switching—in other words selecting the weightings—at each pixel of the signal, thus giving the possibility of choosing the most adapted composition of output interpolation for each individual interpolated pixel.

In the preferred embodiment of the system 1:
the spatial interpolation unit 6 operates by detecting transitions, in association with a spatial reliability. The advantage of this system is that the spatial reliability comes naturally from the transition detection itself;
the motion detection unit 4 takes account of the perceptual dynamic effects of local motion changes in a scene. Compared with other systems, motion detection is provided to give, in combination with spatial reliability and pixel-based decision-making, the best compromise between vertical resolution and performance variation in the event of local motion changes; and
the selection (or decision) unit 10 applies fuzzy logic at the level of each pixel, which takes account of spatial reliability and motion detection to control an output selection switch between spatial and temporal interpolation. The advantage of the system is that it is robust in respect of erroneous motion detection, such as can particularly occur during fast text scrolling. Pixel-based decision-making allows the best de-interlacing performances to be obtained at local level, whatever the source medium (video, film, or mixture).

An important purpose sought in transferring from an interlaced video content to a progressive medium is the elimination of artifacts such as flickering, or "line crawling", which are inherent in an interlaced scanning system.

The suggested algorithm does not require film detection. Indeed, combining directional spatial interpolation and temporal interpolation, controlled by pixel-based decisions, allows locally optimized de-interlacing to be obtained.

Another weak point of existing systems of adaptive pixel-based de-interlacing is that they produce decisions based on motion estimation alone. In that way, they acknowledge their limitations as soon as motion estimation is caught out, which occurs particularly during fast text scrolling, causing artifacts that are very hard to endure.

The system in accordance with the invention does not suffer from a limitation of this kind thanks to its pixel-based decision-making capacity, which uses both motion estimation and the reliability of spatial interpolation.

The reliability of spatial interpolation is taken as read in spatial interpolation since it is derived directly from transition detection.

The algorithm according to the invention is also remarkable, relative to conventional interlacing systems that use a motion estimator, in that the latter, in the case of the invention, takes account of the dynamic perception effects of motion changes. In combination with pixel-based decision-making, the algorithm according to the invention ensures that no switching artifacts can appear in the image when an object starts to move or ceases to move in the image.

Video Formats

The de-interlacing system according to the invention is able to manage the YUV 4:2:2 and YUV 4:2:0 formats derived from the YCRCB digital standard. In principle, the system could be applied to YUV sources 4:4:4, but these YUV sources are generally thought of as exceptional, and generally cannot be managed by the processing blocks which traditionally follow a de-interlacing. The present de-interlacing system does not modify the format. The component parts U and V are co-situate and are always subject to the same processing relative to each other. From now on the component UV will thus be designated jointly and severally, rather than separate reference being made to component parts U and V.

Hereinafter, the following designations are used:

m is the field number. Odd-numbered values of m correspond to the fields including the 1st, $3^{rd}$ etc. lines of the whole image and even-numbered values of m correspond to fields including the 2nd, 4th etc. lines of the whole image;

the line number is n starting with 1 at the top of the image, up to the total number of lines in the complete frame. In odd-numbered fields, Y is defined only for odd-numbered values of n; in even-numbered fields, Y is defined only for even-numbered values of n. The de-interlacing system interpolates on the even-numbered lines of odd-numbered fields and on the odd-numbered lines of even-numbered fields;

the column position is given by a number k starting with 1 for the pixel located furthest left. It is assumed that k is an even number.

For 4:2:2 inputs,
in the odd-numbered fields: UV is defined for each odd-numbered n and for each odd-numbered k, and
in the even-numbered fields: UV is defined for each even-numbered n and each odd-numbered k.

The de-interlacing system interpolates UV,
in the odd-numbered fields: for each even-numbered n and each odd-numbered k in the odd-numbered fields and
in the even-numbered fields: for each odd-numbered n and each odd-numbered k.

For 4:2:0 inputs,
in the odd-numbered fields: UV is defined for n=1, 5, 9, etc and for each odd-numbered k, and
in the even-numbered fields, UV is defined for n=3, 7, 11 and for each odd-numbered k.

The de-interlacing system interpolates UV:
in the odd-numbered fields: for n=3, 7, 11, etc and each odd-numbered k, and
in the even-numbered fields: for n=1, 5, 9 and each odd-numbered k.

The original lines are kept without modification: only the missing lines are interpolated. This makes it possible to retain the field structure throughout processing, and to change to a frame structure only at the output of the de-interlacer. It will be noticed that in algorithms using polyphase filters, such as those typically used in zoom algorithms, the original lines are also modified.

The fact of using the image detail as one of the interpolation selection criteria is advantageous when set against selection techniques based on the single criterion of motion detection, since it allows any failures in motion detection to be made good.

For each pixel, an estimate is made of:
the value the pixel would assume if it was fully interpolated spatially,
the value that the pixel would assume if it was fully interpolated temporally,
the reliability of spatial interpolation in detail detection, and
the reliability of temporal interpolation in motion detection.

In the output selection block, the two aforementioned reliabilities are compared in order to control the fuzzy switching which mixes the two interpolations in order to produce the final output value.

Temporal Interpolation

Figure 2:
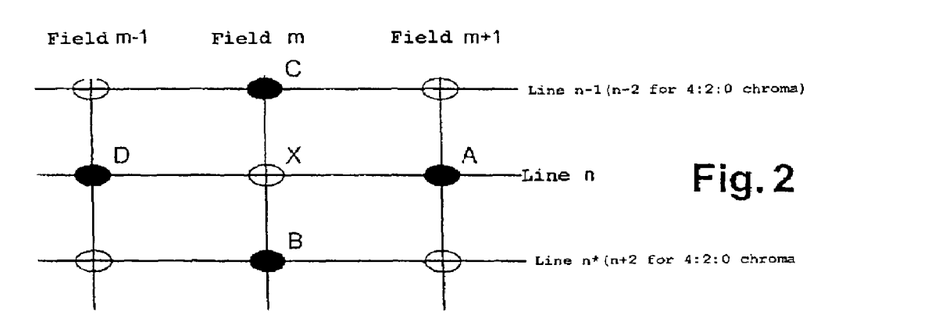
FIG. 2 is a representation of pixels over three lines and covering three successive fields involved in temporal interpolation in accordance with the invention.

The principle of temporal interpolation is shown in FIG. 2.

The interpolation of the missing pixel X is $t=(A+D)/2$, where A and D are the pixels in the same position in the next field and the previous field respectively. Temporal interpolation introduces a delay equal to a field in the system.

For the luma Y, this formula is valid for any even-numbered k and any even-numbered n in the odd-numbered fields, and for any odd-numbered k and any odd-numbered n in the even-numbered fields.

For 4:2:2 chromas, the formula is valid for any odd-numbered k and any even-numbered n in the odd-numbered fields, and for any odd-numbered k and any odd-numbered n in the even-numbered fields.

For 4:2:0 chromas, the formula is valid for any odd-numbered k and n=3, 7, 11, etc in the odd-numbered fields, and for any odd-numbered k and n=1, 5, 9, etc in the even-numbered fields.

Spatial Interpolation

Figure 3:
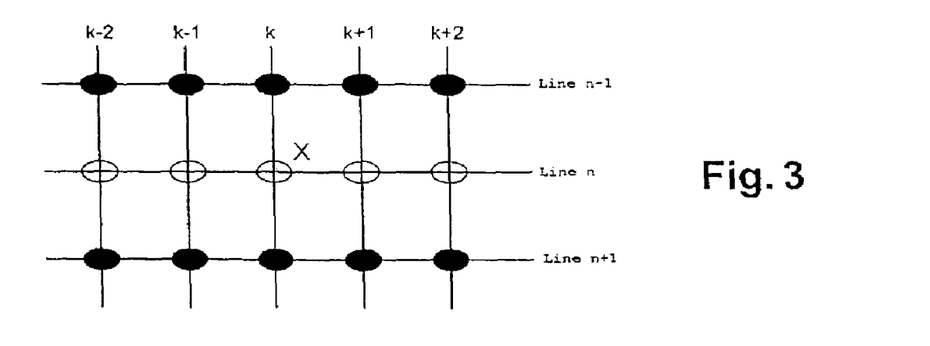
FIG. 3 is a representation of pixels on a window of three lines and five columns of one and the same field involved in spatial interpolation in accordance with the invention.

Spatial interpolation consists in seeking the best direction for the interpolation, this search being carried out within a window of 5*3 pixels, as is shown in FIG. 3.

The approach consists in seeking the direction for which modifications between the line n−1 and the line n+1 are minimal.

By way of example, if the differences between the pixels at positions (n−1, k−2) and (n+1,k−2), (n−1,k−1) and (n+1, k−1), (n−1,k) and (n+1,k), (n−1,k+1) and (n+1,k+1), (n−1, k+2) and (n+1,k+2) tend to be larger than the differences between the pixels at positions (n−1,k) and (n+1,k−2), (n−1,k+1) and (n+1,k−1), (n−1,k+2) and (n+1,k), it will therefore appear more logical to interpolate the missing pixel at position (n,k) as the mean of the pixels at positions (n−1,k+1) and (n+1,k−1), rather than to consider the pixels at positions (n−1,k) and (n+1,k).

The window of 5*3 pixels allows the search to be carried out in the vertical direction and in three diagonal directions on each side.

Figure 4A:
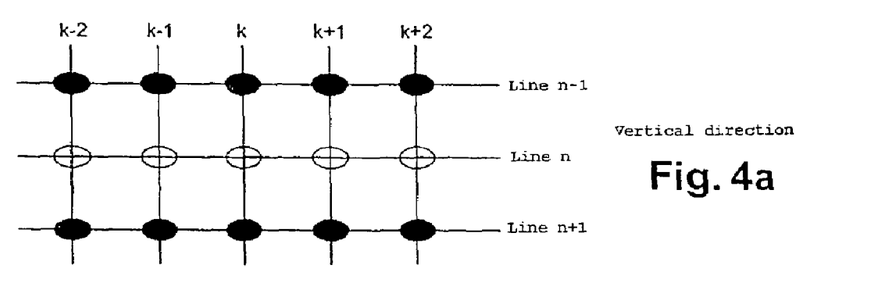
Figure 4B:
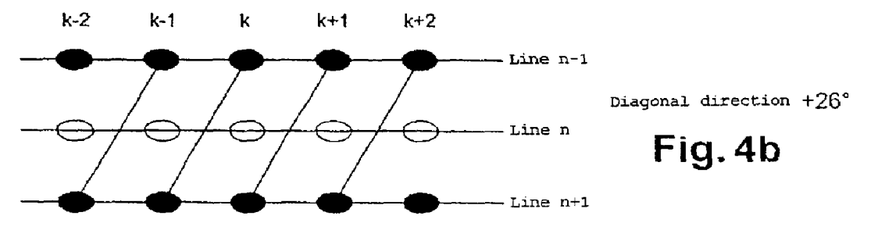
Figure 4C:
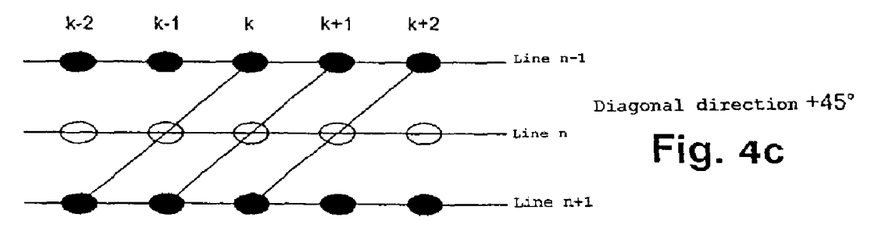
Figure 4D:
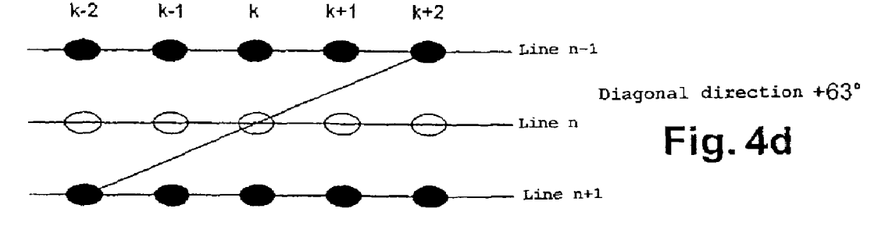
Figure 4E:
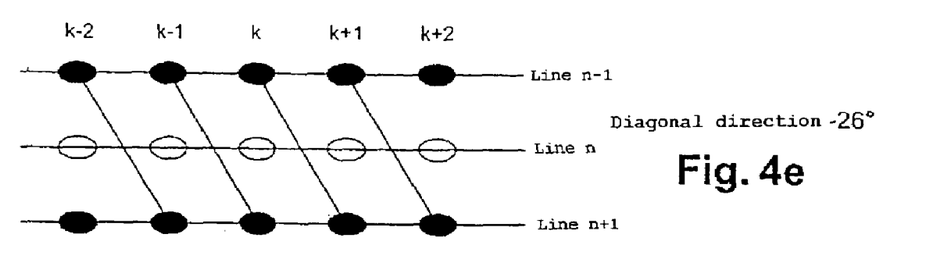
Figure 4F:
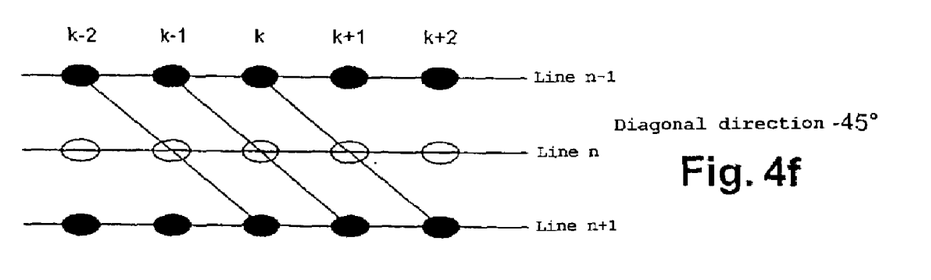
Figure 4G:
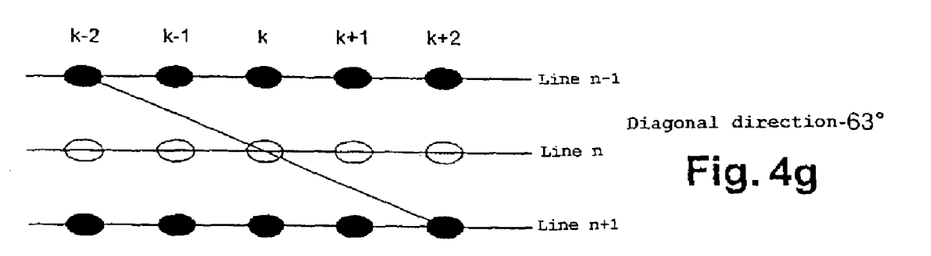

For each direction K, the weighted sum of absolute differences SAD(K) is calculated:

vertical direction (K=0), cf. FIG. 4a:

$$SAD(0)=0.125*|Y(n-1,k-1)-Y(n+1,k-1|+ \\ 0.75*|Y(n-1k)-Y(n+1,k|+0.25*|Y(n-1,k+1)- \\ Y(n+1,k+)|.$$

diagonal direction at 26° (K=1), cf. FIG. 4b:

$$SAD(1)=0.1875*|Y(n-1,k-1)-Y(n+1,k-2)|+ \\ 0.3125*|Y(n-1,k)-Y(n+1,k-1)|+0.3125*|Y(n-1,k+1)-Y(n+1,k)|+0.1875*|Y(n-1,k+2)- \\ Y(n+1,k+1)|.$$

diagonal direction at 45° (K=2), cf. FIG. 4c:

$$SAD(2)=0.3125*|Y(n-1,k)-Y(n+1,k-2)|+ \\ 0.375*|Y(n-1,k+1)-Y(n+1,k-1)|+ \\ 0.3125*|Y(n-1,k+2)-Y(n+1,k)|.$$

diagonal direction at 63° (K=3), cf. FIG. 4d:

$$SAD(3)=|Y(n-1,k+2)-Y(n+1,k-2)|.$$

diagonal direction at −26° (K=−1), cf. FIG. 4e:

$$SAD(-1)=0.1875*|Y(n+1,k-1)-Y(n-1,k-2)|+0.3125*|Y(n+1,k)-Y(n-1,k-1)|+0.3125*|Y(n+1,k+1)- \\ Y(n-1,k)|+0.1875*|Y(n+1,k+2)-Y(n-1,k+1)|.$$

diagonal direction at −45° (K=−2), cf. FIG. 4f:

$$SAD(-2)=0.3125*|Y(n+1,k)-Y(n-1,k-2)|+0.375*|Y(n+1,k+1)-Y(n-1,k-1)|+0.3125*|Y(n+1,k+2)- \\ Y(n-1,k)|.$$

diagonal direction at −63° (K=−3), cf. FIG. 4g:

$$SAD(-3)=|Y(n+1,k+2)-Y(n-1,k-2)|.$$

The best direction for interpolation is the one that corresponds to the minimum SAD value.

The search is conducted for the component Y alone. The best direction found is then also applied in respect of the spatial interpolation of the chroma, as follows:

for a 4:2:2 chroma at a given position (n,k), the decision made for the luma at the position (n,k) is applied;

for a 4:2:0 chroma, UV is not co-situate with the luma Y. At a given position, the decision made for the closest luma sample is applied, i.e. just beneath in the odd-numbered field, or just above in the even-numbered field.

The advantage of having an independent best direction search for the chroma is limited:

the chroma inputs are only available for odd-numbered values of k. It therefore becomes difficult to determine accurately which of the directions, of the vertical at ±63° is the best:

the main benefit of directional interpolation is at transition level. In fact in natural video images, the chroma transitions most often correspond to the positions of the luma transitions;

the attenuation decision is at all events based on the luma component, since it is quite unrealistic to obtain a motion detection on the basis of the chroma.

The spatial interpolations Ys and UVs are defined as follows:

For the luma Y:

If min(SAD)=SAD(0) then $Ys1=(Y(n-1,k)+Y(n+1,k)/2$

If min(SAD)=SAD(1) then $Ys1=(Y(n-1,k)+Y(n+1,k-1)+Y(n-1,k+1)+Y(n+1,k))/4$

If min(SAD)=SAD(2) then $Ys1=(Y(n-1,k+1)+Y(n+1,k-1))/2$

If min(SAD)=SAD(3) then $Ys1=(Y(n-1,k+2)+Y(n+1,k-2))/2$

If min(SAD)=SAD(−1) then $Ys1=(Y(n-1,k-1)+Y(n+1,k)+Y(n-1,k)+Y(n+1,k+1))/4$

If min(SAD)=SAD(−2) then $Ys1=(Y(n-1,k-1)+Y(n+1,k+1))/2$

If min(SAD)=SAD(3) then $Ys1=(Y(n-1,k-2)+Y(n+1,k+2))/2$

Finally Ys is given by: Ys=Ys1 if Ys1 is between Y(n−1,k) and Y(n+1,k), otherwise Ys=(Y(n−1,k)+Y(n+1,k)/2.

The advantage of the last case is that it allows the occurrence of artifacts of discontinuities on subtle transitions to be averted. Such discontinuities are unpleasant, particularly in the presence of text scrolling.

The formula is valid for any even-numbered k and any even-numbered n in the odd-numbered fields, and for any odd-numbered k and any odd-numbered n in the even-numbered fields.

For the 4:2:2 Chroma:

If min (SAD)=SAD(0) then:

$$Vs1=(UV(n-1,k)+UV(n+1,k))/2.$$

If min (SAD)=SAD(1) then:

$$UVs1=(3*UV(n-1),k)+UV(n+1,k-2)+UV(n-1,k+2)+3*UV(n+1,k))/8.$$

If min (SAD)=SAD(2) then:

$$UVs=(UV(n-1,k)+UV(n-1,k+2)+UV(n+1,k-2)+UV(n+1,k))/4.$$

If min (SAD)=SAD(3) then:

$$UVs1=(UV(n-1,k+2)+UV(n+1,k-2))/2.$$

If min (SAD)=SAD(−1) then:

$$UVs1=(UV(n-1),k-2)+3*UV(n+1,k)+3*UV(n-1,k)+UV(n+1,k+2))/8.$$

If min (SAD)=SAD(−2) then:

$$UVs1=(UV(n-1,k-2)+UV(n-1,k)+UV(n+1,k)+UV(n+1,k+2))/4.$$

If min (SAD)=SAD(−3) then:

$$UVs1=(UV(n-1,k-2)+UV(n+1,k+2))/2.$$

Finally Vs is given by: UVs=UVs1 if UVs1 is between UV(n−1,k) and UV(n+1,k), otherwise $UVs=(UV(n-1,k)+UV(n+1,k))/2.$ This formula is valid for any odd-numbered k and any even-numbered n in the odd-numbered fields, and for any odd-numbered k and any odd-numbered n in the even-numbered fields.

For the 4:2:0 Chroma:

By applying the decision made for the closest luma, we have:

If min(SAD)=SAD(0) then $UVs1=(UV(n-2,k)+UV(n+2,k))/2$

If min(SAD)=SAD(1) then $UVs1=(UV(n-2,k)+UV(n+2,k-2)+UV(n-2,k+2)+UV(n+2,k))/4$

If min(SAD)=SAD(2) then $UVs1=(UV(n-2,k+2)+UV(n+2,k-2))/2$

If min(SAD)=SAD(3) then $UVs1=(UV(n-2,k+4)+UV(n+2,k-4))/2$

If min(SAD)=SAD(-1) then $UVs1=(UV(n-2,k-2)+UV(n+2,k)+UV(n-2,k)+UV(n+2,k+2))/4$

If min(SAD)=SAD(-2) then $UVs1=(UV(n-2,k-2)+UV(n+2,k+2))/2$

If min(SAD)=SAD(-3) then $UVs1=(UV(n-2,k-4)+UV(n+2,k+4))/2$.

Finally UVs is given by:

UVs=UVs1 if UVs1 is between UV(n−2,k) and UV(n+2,k), otherwise $UVs=(UV(n-2,k)+UV(n+2,k))/2$.

This formula is valid for any odd-numbered k and n=3, 7, 11 etc. in the odd-numbered fields, and for any odd-numbered k and n=1, 5, 9 etc. in the even-numbered fields.

Case of Multiple Minima

In the event of the presence of several equal minimum SAD values, the direction closest to the vertical direction is chosen. When two symmetrical directions (for example K=1 and K=−1) give the minimum SAD value, it may be considered that the calculation of SAD does not allow a reliable selection of a dominant direction to obtained, and we revert to the vertical interpolation.

Choosing the Window

Choosing the size of the window equal to 5*3 (in pixels) secures a good compromise. By geometry, the width of the window limits the angle of interpolation (to 63°). In practice, it appears that it is rarely useful to have a wider window to reconstruct diagonal transitions and that increasing the window is of very little help in reconstructing almost horizontal transitions.

Tests with a window format of up to 19*3 pixels have been carried out. It then appears that the minimum SAD value rarely equates to an angle above 63°, even in cases of almost horizontal transitions. One explanation would be that for large angles, the pixels taken into account in calculating the SAD are remote from each other, with the result that the probability that they will give a minimum SAD is relatively small. On the other hand, interpolation carried out by averaging pixels that are remote from each other is quite risky. In fact, the system helps to eliminate most diagonal transition situations, but is not in a position to fully reconstruct quasi-horizontal transitions, even with a wide window. In particular, in the event of a quasi-perfect horizontal transition, no minimum SAD is found, and the safest choice is then to interpolate vertically (k=0).

Nor does increasing the height of the window lead to an improvement in performance. The main reason for this is that if the definition of the SAD is simply extended over more lines, the system then searches for transitions with a fixed slope on several lines, and loses its capacity to reconstruct curved transitions.

It will be remembered that directional interpolation produces its benefits especially on transitions. Within an object, the accuracy of the direction is less critical. If the object has no detail, then all the SADs will be close to 0 and any interpolation direction will be acceptable. If the object comprises numerous details or texture, it is important to avoid creating false correlations, between adjacent pixels, which might affect the uncertainty of the detail or the consistency of the texture. For these reasons, it is preferable to use a window of somewhat reduced dimensions.

Calculating SAD

The choice of weightings given to all the absolute differences to calculate the SAD is not critical. However, it is desirable to give more weight to the difference between the pixels that are closest to the missing pixel. In practice, coefficients are chosen which are easy and inexpensive to implement in an integrated circuit.

Choosing the Interpolation Direction

The interpolation direction is simply chosen as the one that corresponds to the minimum SAD. In the case of multiple minima, the direction K is chosen that has the smallest absolute value. As an alternative, it is conceivable to include the values of all the pixels concerned in calculating the spatial interpolation. In practice, this approach is of limited interest, while it implements a more complex calculation. In the event of doubt, the safest direction is in the vertical direction, since it uses the pixels closest to the missing pixel. In the event of multiple minima, it turns out that the directions found are uniformly good (for example within an area devoid of details), and the choice is then immaterial. If the directions found are uniformly bad, it is probable that the temporal interpolation will be weaker and that the interpolation selection unit 10 will restrict any artifacts from erroneous spatial interpolation.

Spatial Interpolation Reliability—Measuring the Detail.

The minimum SAD also provides information about the reliability of the spatial interpolation, and can be used directly as a basic "detail measurement": the higher the detail measurement, the lower the degree of reliability.

Another approach consists in defining the measurement of the detail d as the absolute difference between the two pixels used for the interpolation. In the case of |K|=1, we take:

for K=1, $d=(|Y(n-1),k+1)+Y(n-1,k)-Y(n+1,k)-Y(n+1,k-1)|)/2$.

for k=−1, $d=(|Y(n-1),k-1)+Y(n-1,k)+Y(n+1,k)-Y(n+1,k+1)|)/2$.

The detail is measured only on Y, since the decision in respect of the interpolation selection unit 10 is made only for Y.

A detail measurement is sought which is well in balance with the motion detection, so as to ensure the selection switch operates properly. The two aforementioned detail measurements satisfy this condition.

It will be noted that the SAD is no longer an adequate detail measurement when the weightings given to all the absolute differences between the pixels that are closest to the missing pixel in the SAD are not higher than the others (particularly in the case of K=0).

Motion Detection

The first reason to use the interpolation selection unit 10 with choice of output between spatial interpolation and temporal interpolation is to guard against dynamic artifacts and to reduce the contribution of temporal interpolation if necessary. In practice, the loss of definition is considered as more acceptable for most observers.

Attenuation is then controlled above all from a measurement of motion. The purpose of the measurement is to give a measure of the reliability of temporal interpolation.

Figure 5:
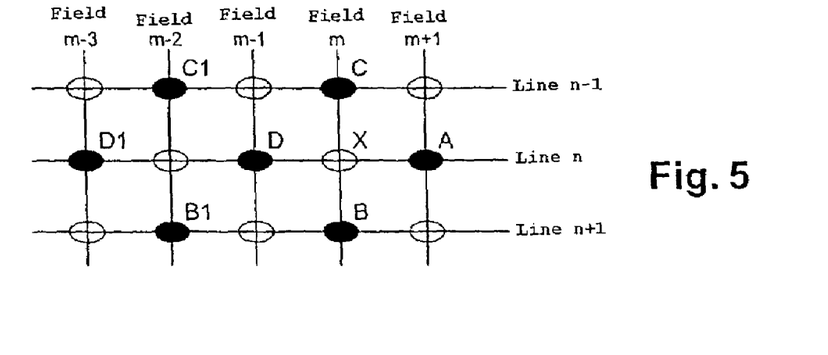
FIG. 5 is a representation of pixels over three lines and covering five successive fields involved in the detection of motion in accordance with the invention.

FIG. 5 shows a window of 3*5 pixels used to determine a motion D around a pixel X, located in the field m and at line n and in column k. This window occupies three lines: n−1, n and n+1 and five fields: m−3, m−2, m−1, m and m+1.

In the expressions given below, the following designations are used:

A=a pixel in the field m+1, at line n and in column k
B=a pixel in the field m, at line n+1 and in column k
B1=a pixel in the field m−2, at line n+1 and in column k
D=a pixel in the field m−1, at line n and in column k
D1=a pixel in the field m−3, at line n and in column k
C=a pixel in the field m, at line n−1 and in column k
C1=a pixel in the field m−2, at line n−1 and in column k.

(The designations A, B, B1, D, D1, C, C1 correspond in fact to the values of the respective pixels.)

In this approach, the motion around a pixel X may be considered as the median of the absolute differences |A−D|, |B−B1|, |C−C1|. In practice, however, safety comes first and the desire is for the interpolation selection unit to move more towards spatial interpolation as soon as temporal interpolation becomes too uncertain.

This may be achieved by means of a maximum motion estimation around the pixel X:

$$M=\max(|A-D|,|D-D1|, \text{median } (|A-D|,|B-B1|,|C-C1|).$$

What precedes may be formulated in an equivalent manner as follows:

$$M0=\max(|A-D|,|D-D1|)$$

$$Mp=\min(|B-B1|,|C-C1|)$$

$$M=\max(M0,Mp).$$

One drawback of this implementation lies in the fact that it requires four field memories, whereas |D−D1|, |B−B1| and |C−C1| have previously been calculated in respect of evaluating motion for the previous fields.

Another drawback is that the perceptive dynamic effects are not properly taken into account. In particular, when an object ceases to move, the motion measurement tends towards zero, the interpolation selection unit will suddenly move towards temporal interpolation, causing a sudden increase in resolution, which necessitates an ocular adjustment on the part of the observer. On the other hand, the system has to react rapidly when an object starts to move, even at the cost of a loss of resolution.

The following recursive implementation is therefore proposed.

$$M0=\max(|A-D|, FA*M(N))$$

$$Mp=\min(M(N1),M(N1+1))$$

$$M=\max(M0,Mp),$$

where:

A is the pixel in the same position as the pixel X, but in the field m+1,

D is the pixel in the same position as the pixel X, but in the field m−1,

M(N) equates to the value M0 calculated one frame before, i.e. N lines before, with N being the total number of lines, M(N1) equates to the value M0 calculated N1 lines before where N1=(N−1)/2 in the event of N being odd-numbered N1=(N−2)/2 in the event of N being even-numbered and where the luma lines for interpolation are the $2^{nd}$, $4^{th}$ etc. lines of the image N1=N/2 in the event of N being even-numbered and where the luma lines for interpolation are the $1^{st}$, $3^{rd}$ etc. lines of the image M(N+1) equates to the value M0 calculated (N1+1) lines before, and FA is the attenuation factor (15/16 as the default setting).

Figure 6:
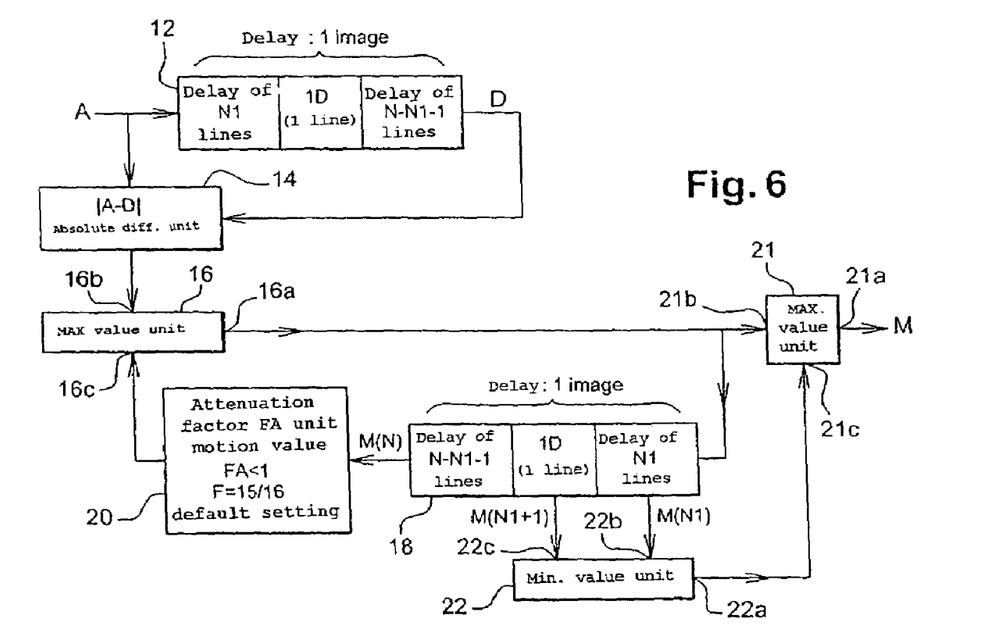
FIG. 6 is a system diagram of the elements that allow application of a motion detection algorithm in accordance with the present invention.

FIG. 6 shows symbolically a system for measuring motion that allows this algorithm to be executed. At the input of this system is presented a pixel value A, in the event the pixel of same designation on the window shown in FIG. 5 in field m+1 and at line n. The pixel designated X, belonging to the same line n but in the field m, corresponds to the pixel for which the motion is being estimated. It is noted that the pixel A exists at the level of the interlaced input signal, whereas the pixel X, located at the same location but on the previous field, is absent from the input signal, and its value must be interpolated.

The pixel A is subject to a delay equal to:

N1 lines, typically 240 lines in digital NTSC, 288 lines in digital PAL or SECAM via a first delay element 12. In the figure, this delay is shown diagrammatically by a delay of a field, followed by a delay of a line, then of a field.

The output of this delay element thus corresponds to the pixel D in FIG. 5. The pixels A and D are presented to an absolute difference calculation unit 14, which establishes the part |A−D| of the expression M0=max(|A−D|,15/16*M(N)).

A first maximum value determination unit 16, which produces at output 16a the largest of the two values presented at respective inputs 16b and 16c, collects at one of these inputs 16b the output |A−D| of the unit 14 and at the other 16c a value coming from a feedback loop from its output 16a. This line introduces the recursive character of the motion analysis. More particularly, this line includes a second delay element 18, identical to the first 12, the input of which receives the data item M0, present at the output 16a of the first maximum value determination unit. The delayed output of an image M(N) of the second delay element 18 is presented at input of a gain application unit 20 which applies an attenuation factor FA of 15/16 on its algebraic motion value. This value thus reduced of M(N) is applied at the second input 16c of the maximum value determination unit 16.

At the output of the feedback loop, a second maximum value determination unit 21 produces the value M at its output 21a. This value corresponds to the maximum between on the one hand the data item M0 presented at a first input 21b of this unit and the data item coming from a minimum value determination unit 22, present at its second input 21c. The minimum value determination unit 22 produces at its output 22a whichever of the two data items M(N1) and M(N1+1) presented at respective inputs 22b and 22c has the minimum value. The data item M(N1) corresponds to the motion calculated between the pixels B1 and B in FIG. 5. This arrangement avoids storing the field m−2, which would otherwise be necessary to determine this motion value. The data item M(N1+1) corresponds to the motion value between C and C1, calculated one line earlier.

In this way, the output of the value M corresponds to M0, except if one of the values M(N1) or M(N1+1) is higher than it, in which case the output M will correspond to the lesser of these two values, in accordance with the conditions established above for the algorithm.

The attenuation factor FA of 15/16, less than 1, makes it possible to obtain the convergence of the algorithm and to produce the dynamic behavior sought.

Other values of FA are conceivable according to the applications and parameterization of the system.

Tests have shown that too great a reduction in the attenuation factor, in other words excessive attenuation of the value M(N), can lead to dynamic artifacts. This is explained by the fact that when the attenuation factor is reduced, the final M tends to be lower and no longer fully matches the detail measurement in the output mixer. Small groups of pixels or isolated pixels are then obtained which tend to be interpolated temporally, whereas they should be interpolated spatially.

It may be noted that the value of M is used for decision-making, and not as a data item directly influencing the interpolated value. The convergence time is acceptable, if not even desirable. On the one hand, an advantage can be drawn from it, since this time period prevents a sudden swing from spatial interpolation to temporal interpolation when parts of the image become motionless, which constitutes a major common artifacts with mixed temporal and spatial algorithms. For the eye, abrupt changes in clarity are perceived as irritating and tiring for its adaptation system. On the other hand, sudden changes from temporal interpolation to spatial interpolation are likely to occur when parts of the image begin to move. However this choice remains reasonable in order to avoid dynamic artifacts, which are perceived as still more unpleasant than abrupt changes in definition.

In conclusion, the motion measurement proposed is above all dedicated to controlling the interpolation selection unit 10 for the system proposed.

Switching for output selection between a spatial interpolation and a temporal interpretation.

Decision on the Luma.

The purpose of the interpolation selection unit 10 is to decide, for each pixel, if the interpolation produced at the output is to be of the temporal or spatial type. This decision is made on the luma.

The algorithm gives for the final interpolation on the luma:

$$I = med(s, t+M, t-M) \text{ if } M \leq d$$

otherwise I=s.

where: l represents the final interpolation s represents the spatial interpolation t represents the temporal interpolation M represents the motion measurement at the position for interpolation, d represents the detail measurement at the position for interpolation and med (a,b,c) represents the median function of a,b,c.

This system has the advantage of being very robust in respect of erroneous motion detection, especially in the event of fast text scrolling. This is explained by the fact that, unlike other adaptive de-interlacing systems working on pixels, the decisions depend not only on motion estimation, but also on the reliability of the spatial interpolation.

Behavior of the Interpolation Selection Unit in Respect of the Chroma.

For the chroma pixels, in a rigorous way, the preceding formula cannot be applied directly to the chroma. The intention in fact is that the chroma should follow the decision made for the closest luma, at each pixel position.

If the final luma interpolation is considered, it will be noted that it can always be written by the expression:

$$l = a(d,M)*t + (1-a(d,M))*s, \text{ with } a(d,M;) \text{ between } 0 \text{ and } 1.$$

One possibility would be to calculate the value of a for each pixel and to apply this value to the interpolation of the chroma.

However that is relatively expensive in terms of system resources, since it requires a divider. Furthermore, nor is the value of a in the formula for the luma calculated very accurately outside the limit conditions $$a(d,M)=1 \text{ for } M=0$$

$$a(d,M)=0 \text{ for } M>d.$$

In fact, the parameters (t−M) or (t+M) are simple values easy to calculate between the temporal and spatial interpolations.

Therefore, for the chroma, the following criteria are established in order to determine if the interpolation used at the output should tend to be spatial or temporal:

if the final value of the interpolation for the luma is closest to that of the spatial interpolation, spatial interpolation is selected for the chroma;

if the final value of the interpolation for the luma is closest to that of the temporal interpolation, temporal interpolation is selected for the chroma;

if the final value of the interpolation for the luma is exactly the mean of the two interpolations, spatial interpolation is selected for the chroma, which is the safest.

As an alternative, the luma formula may be applied with a slight loss of performance and spatial interpolation can also be used systematically for the chroma, which allows the field memory capacity required for temporal interpolation to be reduced, with a loss of performance on the chroma.

Initialization.

Launching the Sequence.

The system operates with a delay of a field on account of the temporal interpolation and the motion calculation. As a result of this delay, fields 1 and 2 are available for the reconstruction of field 1.

At the beginning of the sequence, the motion M0 is initialized at 0.

For the temporal interpolation of field 1, the information about the previous field is not available. Instead of this missing information, the first available information is used. As is shown in FIG. 5, the parameter D is replaced by A, which gives a temporal interpolation equal to A. Then, the initial corresponding motion is 0, giving rise to a pure temporal interpolation for the first field (in fact a field fusion).

For the interpolation of field 2, the temporal interpolation can be carried out normally. The motion will go to |A−D|. This means that the dynamic artifacts likely to occur in respect of the interpolation of field 1 will already have almost disappeared from the interpolation of field 2. The existence of a field with the wrong interpolation at the outset is barely conceivable.

Edges of the Image

First Luma Line of the Even-Numbered Field.

The first line for the spatial interpolation of the even-numbered field is line 1. In order to interpolate this line, the information about the line above is not available. It is proposed instead to use the information from the first available line, in other words that in line 2. This means that the spatial interpolation of line 1 becomes equal to that of line 2, since the best direction for the interpolation will necessarily be the vertical direction (SAD (0)=0.

The detail measurement will then be at 0 for the whole line.

In respect of motion detection, the missing information C and C1 is also replaced by B and B1. If the motion is equal to 0, the attenuator will select temporal interpolation; otherwise it will select spatial interpolation.

Last Luma Line of the Odd-Numbered Field.

In the same way, in respect of spatial interpolation of the last line of the odd-numbered field, in the event of N being even-numbered, the information from the line below is missing. It is proposed to use instead information from the last available line, in other words the line N−1 if the total number of lines is N lines per frame (even-numbered N). The last line subject to spatial interpolation is equal to the line N−1.

First and Last Chroma Lines.

In the event of a 4:2:2 chroma, the same principle can be adopted as for the luma. This means that use is made of the information from the first available line at the beginning of the even-numbered field and the last line available at the end of the odd-numbered field.

In the event of a 4:2:0 chroma, the information is not available in respect of the interpolation of line 1 of the even-numbered fields and of the line (N−1), this in the odd-numbered field if N is a multiple of 4, or in the even-numbered field if N is not a multiple of 4. For the interpolation of the line 1 in the even-numbered field, it is known that the spatial interpolation of the luma will be in the vertical direction. Therefore, for the interpolation of the chroma, the first chroma information available can be used in order to replace the missing information; this leads to an interpolated line 1 equal to the original line 3. For the line (N−1), the direction of the interpolation calculated from the luma is not always vertical. In order to follow on the decision on the chroma, we have:

if min(SAD)=SAD(0) then $UVs=UV(N-3,k)$ if min(SAD)=SAD(1) then $UVs=(UV(N-3,k)+UV(N-3,k+2))/2$ if min(SAD)=SAD(2) then $UVs=UV(N-3,k30\ 2)$ if min(SAD)=SAD(3) then $UVs=UV(N-3,k30\ 4)$ if min(SAD)=SAD(−1) then $UVs=(UV(N-3,k-2)+UV(N-3,k))/2)$ if min(SAD)=SAD(−2) then $UVs=UV(N-3,k-2)$ if min(SAD)=SAD(−3) then $UVs1=UV(N-3,k-4)$ In conclusion, the interpolation of the first or last lines can be carried out by replacing the missing pixels with pixels that are symmetrical relative to the position subject to interpolation.

First and Last Pixels of a Line.

For a pixel position at $k \leq 2$, the whole window cannot be defined for directional spatial interpolation.

This problem can be resolved by replacing the missing pixels by the first available pixel in order to calculate the SAD and to calculate the interpolated value. The correspondences:

$K=0 \Rightarrow$ vertical $K=\pm 1 \Rightarrow \pm 26°$ $K=\pm 2 \Rightarrow \pm 45°$ $K=\pm 3 \Rightarrow \pm 63°$ are no longer respected, but the minimum SAD will still correspond to the best objective direction for the interpolation.

The same initialization is made for the chroma pixels in the odd-numbered columns: any missing pixel in the interpolation formula is replaced by the first available pixel.

For example, for the first pixel on the left (k=1), the calculation is:

$SAD(0)=0.875*|Y(n-1,1)-Y(n+1,1)|+0.125*|Y(n-1,2)-Y(n+1,2)|$ $SAD(1)=0.5*|Y(n-1,1)-Y(n-1,1)|+0.3125*|Y(n-1,2)-Y(n+1,1)|+0.1875*|Y(n-1,3)-Y(n+1,2)|$ $SAD(2)=0.3125*|Y(n-1,1)-Y(n+1,1)|+0.375*|Y(n-1,2)-Y(n+1,1)|+0.3125*|Y(n-1,3)-Y(n+1,1)|$ $SAD(3)=|Y(n-1,3)-Y(n+1,1)|$ $SAD(-1)=0.5*|Y(n+1,1)-Y(n-1,1)|+0.3125*|Y(n+1,2)-Y(n-1,1)|+0.1875*|Y(n+1,3)-Y(n-1,2)|$ $SAD(-2)=0.3125*|Y(n+1,1)-Y(n-1,1)|+0.375*|Y(n+1,2)-Y(n-1,1)|+0.3125*|Y(n+1,3)-Y(n-1,2)|$ $SAD(-3)=|Y(n+1,3)-Y(n-1,1)|.$

If min(SAD)=SAD(−3) then $Ys1=(Y(n-1,1)+Y(n+1,3))/2$.

Finally Ys is given by:

$Ys=Ys1$ if $Ys1$ is between $Y(n-1,1)$ and $Y(n+1,1)$ otherwise $Ys=(Y(n-1,1)+Y(n+1,1))/2$ With the chroma UVs1=(UV(n−1,1)+UV(n+1,3))/2.
Finally, UVs is given by:

$UVs=UVs1$ if $UVs1$ is between $UV(n-1,1)$ and $UV(n+1,1)$ otherwise UVs=(UV(n−1,1)+UV(n+1,1))/2.

The same principle is applied for the last pixels of the line: the missing pixels are replaced by the last available pixel of the line.

The performance of the different algorithms proposed has been subjected to tests on various sequences. It has emerged from this that relative to other de-interlacing systems, the algorithm proposed brings remarkable improvements particularly to sensitive elements such as logos, static or scrolling text, and to the clarity of motion transitions.

The system according to the invention operates correctly even with images coming from a film medium and it does so without film detection.

Film detection is necessary in most de-interlacing systems so as to avoid losses of resolution when the image comes from film stock.

In the system according to the invention, when the images are extracted from a film medium the following circumstances may be distinguished:

in the static parts, the attenuator tends towards a completely temporal interpolation, equivalent to a local fusion of the two fields, equivalent to the conventional de-interlacing of film stock;

in the parts of details in motion, advantage is taken of directional interpolation which gives results still very close to those of a fusion of the two fields for the film stock. The system capitalizes to advantage on the fact that the eye can identify above all the limitations of objects in the parts of an image in motion.

Sophisticated vector-based motion compensation systems allow a slightly better reproduction of details in movement, but are much more expensive and suffer from the weaknesses of de-interlacing systems that require a film detection.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A process for de-interlacing a video signal, the process comprising:
   producing a de-interlaced video output signal by interpolating a plurality of pixels missing from an interlaced video input signal;
   wherein the interpolating performed on the output signal is produced from a selection of a spatial interpolation and a temporal interpolation, whereby the selection is made based upon a determination of,
   a variable degree of presence of at least one of the spatial interpolation and the temporal interpolation in a composition of the output signal, with the composition having a range from one-hundred percent of the spatial interpolation to one-hundred percent of the temporal interpolation,
   a function of a detection of motion in a portion of a video image being interpolated;
   including a detection of a detail measurement in the portion of the video image for determining a degree of reliability the spatial interpolation.

2. The process according to claim 1, wherein the determination is made in respect of each individual interpolated pixel in the plurality of pixels inserted into the output signal.

3. The process according to claim 1, wherein the spatial interpolation is made on the basis of a determination of a selected direction, among a series of directions under consideration connecting pixels on different lines of a given pixel window, for which a minimum difference is obtained between values of the pixels on the different lines so as to connect along the selected direction, and in that one of the directions in the series of directions corresponds to an angle of approximately 26° relative to a vertical direction, for a geometry with a pixel pitch equal in the vertical direction and a horizontal direction.

4. The process according to claim 3, wherein the spatial interpolation is made on the basis of the determination of the selected direction, among the series of directions under consideration connecting pixels on different lines of the given pixel window, for which the minimum difference is obtained between values of the pixels on the different lines so as to connect along the selected direction, and in that one of the directions in the series of directions corresponds to an angle of approximately 63° relative to the vertical direction, for the geometry with a pixel pitch equal in the vertical direction and the horizontal direction.

5. The process according to claim 4, wherein the spatial interpolation is made on the basis of the determination of the selected direction, among the series of directions under consideration connecting pixels on different lines of the given pixel window, for which the minimum difference is obtained between values of the pixels on the different lines so as to connect along the selected direction, and in that when there are several direction producing the same minimum difference between the values of the pixels so connected, the direction closest to a vertical direction is selected.

6. The process according to claim 5, wherein the spatial interpolation is made on the basis of the determination of the selected direction, among the series of directions under consideration connecting pixels on different lines of the given pixel window, for which the minimum difference is obtained between values of the pixels on the different lines so as to connect along the selected direction, and in that when there are two diametrically opposed symmetrical directions producing the same minimum difference between the values of the pixels so connected, the vertical direction is selected.

7. The process according to claim 6, wherein the spatial interpolation is made on a basis of an averaging of pixel values, and wherein identical pixel positions are taken to determine both an averaging of a luma component of the interlaced input video signal and an averaging of a chroma component, insofar as the identical pixel positions are available for the luma component and the chroma component.

8. The process according to claim 7, wherein the spatial interpolation is made on the basis of the determination of the selected direction, among the series of directions under consideration connecting pixels on different lines of the given pixel window, for which the minimum difference is obtained between values of the pixels on the different lines so as to connect along this direction, and
   wherein the determination is made on the luma component of the input signal, and in the given direction so determined is also used as an interpolation direction for the chroma component of the input signal.

9. The process according to claim 1, wherein the spatial interpolation is made on the basis of a determination of the selected direction, among a series of directions under consideration connecting pixels on different lines of a given pixel window, for which the minimum difference is obtained between values of the pixels on the different lines so as to connect along the selected direction, and in that one of the directions in the series of directions corresponds to an angle of approximately 63° relative to a vertical direction, for a geometry with a pixel pitch equal in the vertical direction and a horizontal direction.

10. The process according to claim 1, wherein the spatial interpolation is made on the basis of a determination of a selected direction, among a series of directions under consideration connecting pixels on different lines of a given pixel window, for which a minimum difference is obtained between values of the pixels on the different lines so as to connect along the selected direction, and in that when there are several directions producing a same minimum difference between the values of the pixels so connected, a direction closest to a vertical direction is selected.

11. The process according to claim 1, wherein the spatial interpolation is made on the basis of a determination of a selected direction, among a series of directions under consideration connecting pixels on different lines of a given pixel window, for which the minimum difference is obtained between values of the pixels on the different lines so as to connect along the selected direction, and in that when there are two diametrically opposed symmetrical directions producing a same minimum difference between the values of the pixels so connected, a vertical direction is selected.

12. The process according to claim 1, wherein the spatial interpolation is made on a basis of an averaging of pixel values, and wherein identical pixel positions are taken to determine both an averaging of a luma component of the interlaced input video signal and an averaging of a chroma component, insofar as the identical pixel positions are available for the luma component and the chroma component.

13. The process according to claim 1, wherein the spatial interpolation is made on a basis of a determination of a selected direction, among a series of directions under consideration connecting pixels on different lines of a given pixel window, for which a minimum difference is obtained between values of the pixels on the different lines so as to connect along this direction, and
   wherein the determination is made on a luma component of the input signal, and in the given direction so determined is also used as an interpolation direction for the chroma component of the input signal.

14. The process according to claim 1, wherein the motion detection is carried out, for a given pixel of the plurality of pixels, by a recursive calculation implementing an intermediate motion value loop M0 with attenuation by a factor of less than 1.

15. The process according to claim 14, wherein a motion value M is determined for a pixel for interpolation X of a field m by the following algorithm:

$M0=\max(|A-D|,FA*M(N))$, $Mp=\min(M(N1),M(N1+1))$, $M=\max(M0, Mp)$, where:
   A is a pixel in a same position as a pixel X, but in a field m+1,
   D is a pixel in a same position as the pixel X, but in a field m−1,
   M(N) equates to a value M0 calculated one frame before, with N being a total number of lines in the image,
   M(N1) equates to the value M0 calculated N1 lines before,
   N1=(N−1)/2 when N being odd-numbered,
   N1=(N−2)/2 when N being even-numbered and a luma lines for interpolation being a series of even numbered lines of the image,
   N1=N/2 when N being even-numbered and the luma lines for interpolation being a series of odd numbered lines of the image,
   N1=N/2 when N being even-numbered and the luma lines for interpolation being the series of odd numbered lines of the image, and
   M(N1+1) equates to the value M0 calculated (N+1) lines before, and FA is the attenuation factor.

16. The process according to claim 15, wherein the attenuation factor FA is equal to 15/16.

17. The process according to claim 14, wherein the attenuation factor FA is equal to 15/16.

18. The process according to claim 1, wherein a weighting for the selection of the spatial interpolation and the temporal interpolation is determined on a basis of a luma component of the input signal.

19. The process according to claim 18, wherein the interpolation is determined on the luma component of the input signal is obtained by the following algorithm:

$I=\mathrm{med}(s,t+M,t-M)$ if $M \leq d$ otherwise I=s, where I represents the final interpolation,
   s represents the spatial interpolation,
   t represents the temporal interpolation,
   M represents the motion measurement at a position for interpolation,
   D represents the detail measurement at the position for interpolation, and
   med (a,b,c) represents the median function of a,b,c.

20. The process according to claim 19, wherein the selection is made on the basis of the luma component of the input signal is also applied to a chroma component.

21. The process according to claim 20, wherein the interpolation includes one or more of the following:
   when a final interpolation on the luma component is closer to the temporal interpolation, the final interpolation of the chroma component is the temporal interpolation; and
   when the final interpolation on the luma component is closer to the spatial interpolation, the final interpolation of the chroma component is the spatial interpolation; and
   when the spatial interpolation and the temporal interpolation have an equal contribution in the final interpolation of the luma component, the spatial interpolation and the temporal interpolation have an equal contribution in the final interpolation of the chroma component.

22. A device for de-interlacing a video signal, comprising:
   means for producing a de-interlaced video output signal by interpolating a plurality of pixels missing from an interlaced video input signal;
   wherein the interpolating performed on the output signal is produced from a selection of a spatial interpolation and a temporal interpolation, whereby the selection is made based upon a determination of,
   a variable degree of presence of at least one of the spatial interpolation and the temporal interpolation in a composition of the output signal, with the composition having a range from one-hundred percent of the spatial interpolation to one-hundred percent of the temporal interpolation,
   a function of a detection of motion in a portion of a video image being interpolated
   including a detection of a detail measurement in the portion of the video image for determining a degree of reliability the spatial interpolation.

23. The device according to claim 22, wherein the means determines a weighting for each individual interpolated pixel in the plurality of pixels.

24. The device according to claim 22, wherein the spatial interpolation is made on the basis of a determination of a selected direction, among a series of directions under consideration connecting pixels on different lines of a given pixel window, for which a minimum difference is obtained between values of the pixels on the different lines so as to connect along the selected direction, and in that one of the directions in the series of directions corresponds to an angle of approximately 26° relative to a vertical direction, for a geometry with a pixel pitch equal in the vertical direction and a horizontal direction.

25. The device according to claim 22, wherein the spatial interpolation is made on the basis of a determination of the selected direction, among a series of directions under consideration connecting pixels on different lines of a given pixel window, for which the minimum difference is obtained between values of the pixels on the different lines so as to connect along the selected direction, and in that one of the directions in the series of directions corresponds to an angle of approximately 63° relative to a vertical direction, for a geometry with a pixel pitch equal in the vertical direction and a horizontal direction.

26. The device according to claim 22, wherein the motion detection is carried out, for a given pixel of the plurality of pixels, by a recursive calculation implementing an intermediate motion value loop M0 with attenuation by a factor of less than 1 and wherein a motion value M is determined for a pixel for interpolation X of a field m by the following algorithm:

$M0 = \max(|A-D|, FA*M(N))$, $Mp = \min(M(N1), M(N1+1))$, $M = \max(M0, Mp)$, where:
- A is a pixel in a same position as a pixel X, but in a field m+1,
- D is a pixel in a same position as the pixel X, but in a field m−1,
- M(N) equates to a value M0 calculated one frame before, with N being a total number of lines in the image,
- M(N1) equates to the value M0 calculated N1 lines before,
- N1=(N−1)/2 when N being odd-numbered,
- N1=(N−2)/2 when N being even-numbered and a luma lines for interpolation being a series of even numbered lines of the image,
- N1=N/2 when N being even-numbered and the luma lines for interpolation being a series of odd numbered lines of the image,
- N1=N/2 when N being even-numbered and the luma lines for interpolation being the series of odd numbered lines of the image, and
- M(N1+1) equates to the value M0 calculated (N+1) lines before, and FA is the attenuation factor.

* * * * *